United States Patent [19]

Van Sise, Jr.

[11] Patent Number: 6,161,798
[45] Date of Patent: Dec. 19, 2000

[54] EMERGENCY WARNING DEVICE

[76] Inventor: Robert B. Van Sise, Jr., 547 N. Suffolk Ave., Massapequa, N.Y. 11758

[21] Appl. No.: 09/070,358

[22] Filed: Apr. 30, 1998

[51] Int. Cl.$^7$ ................................................ B64D 47/02
[52] U.S. Cl. ............................................................ 244/1 R
[58] Field of Search .................................. 244/1 R, 121; 340/309.15; 381/86, 87

[56] References Cited

U.S. PATENT DOCUMENTS

| | | | |
|---|---|---|---|
| 1,581,586 | 4/1926 | McCauley et al. | 244/1 R |
| 2,392,394 | 1/1946 | Lear | 244/1 R |
| 2,983,791 | 5/1961 | Menarik et al. | 381/86 |
| 3,529,085 | 9/1970 | Banks | 381/86 |
| 4,297,678 | 10/1981 | Lee | 340/309.15 |
| 4,964,331 | 10/1990 | Halevy et al. | 244/1 R |
| 5,321,760 | 6/1994 | Gray | 281/86 |

*Primary Examiner*—Galen L. Barefoot
*Attorney, Agent, or Firm*—Greenberg Traurig, LLP; Anthony R. Barkume

[57] ABSTRACT

Provided is an emergency warning device useful for quickly warning persons in danger of being struck by a disabled aircraft during an emergency landing procedure. The emergency warning device consists of a mounting assembly, a sound emitting device, a power supply, and a switch. The mounting assembly consists of a door pivotably mounted on the cowling of the aircraft, the door having an external surface substantially flush with the external surface of the aircraft such that the aerodynamic characteristics of the aircraft are not substantially altered when the door is in a closed position. The power source selectively provides power, independent from the aircraft power, to the sound emitting device. The switch connects the sound emitting device to the power source upon activation of the emergency warning device. The mounting assembly exposes the sound emitting device in an open position upon activation of the emergency warning device such that the sound emitting device is audible external to the aircraft. A portable version of the emergency warning device is also provided, which is self-contained in a unitary housing. An inverted U-shaped member is provided to allow the self-contained emergency warning device to be easily and quickly mounted on the outside of an open cockpit window in the case of an emergency.

7 Claims, 11 Drawing Sheets

EMERGENCY WARNING DEVICE

BACKGROUND OF THE INVENTION

The present invention relates to aircraft safety equipment and in particular, to an apparatus for quickly warning persons in danger of being struck by a disabled aircraft during an emergency landing procedure.

Aircraft such as airplanes and rotorcraft (i.e., helicopters) often experience a variety of emergency conditions such as engine failure, fires, lack of fuel, reduced oil pressure, and any condition which is outside normal operating conditions as specified in the guidelines for operating the specific aircraft. Many of these emergency conditions force a pilot of the aircraft to make an unscheduled off-airport and/or off-field landing. Such a landing can be extremely hazardous to those persons that are in the path of the aircraft. Since the emergency condition often results in engine failure, the disabled aircraft essentially glides to the selected emergency landing spot so quietly that a person in its path cannot hear the aircraft, is unaware of its unexpected approach, and is in extreme danger as a result. Furthermore, in many instances the spontaneity of the emergency and the speed of the aircraft are such that it is impossible to issue any kind of advance warning that could enable people on the ground or water to escape impending danger.

Therefore, it would be advantageous if an apparatus could issue a sufficient warning to people on land or on water that an emergency condition exists on the aircraft, and that the aircraft poses a threat to those in the immediate area.

Under normal operating conditions most aircraft travel forward at great speeds, and the slightest protrusion from the body of the aircraft can have a significant effect on its aerodynamics in terms of increased drag and alterations in handling characteristics. Therefore, it is critical that an apparatus which warns of the presence of an emergency condition be unobtrusive and does not create a significant effect on the aerodynamic characteristics of the aircraft during normal (non-emergency) operation.

As with any safety device, the emergency warning device should be able to operate independently of the state of the remaining equipment on the aircraft that it is responsible for monitoring. Therefore, it is crucial that the detection, activation, and power mechanisms of the emergency warning system be independent from on-board equipment.

It would also be advantageous to provide such an emergency warning device that may be easily retrofitted as a kit on existing aircraft already in use.

It would also be advantageous if such a device could be made to be portable so that it may be utilized by a pilot during an emergency situation without the need for retrofitting the aircraft.

SUMMARY OF THE INVENTION

In accordance with the present invention an emergency warning device suitable for installation in the underside of an aircraft is provided comprising a mounting assembly, a sound emitting device, a self-contained power supply, and an activation mechanism. The mounting assembly is a door-like device and comprises an external surface adapted to be substantially flush with the external surface of the aircraft such that the aerodynamic characteristics of the aircraft are not substantially altered when the mounting assembly is in a closed position. However, when the emergency warning device is activated and in the open position, the aircraft speed will be held to a normal glide speed value, and because it is much slower, the change in the aerodynamics will be correspondingly less (i.e., proportional to the square root of velocity) than it would otherwise be at normal cruise speed. The power source comprises a sealed battery, gel cell or equivalent sources of power well known in the art and is mounted inside the aircraft, near the mounting assembly, and provides power independent from the aircraft power to the sound emitting device. The sound emitting device is mounted on an internal surface of the mounting assembly, and is positioned so that it is exposed to the outside of the aircraft when the warning device is activated (see FIG. 1). The means of activation comprises a switch that connects the sound emitting device to the power source upon activation of the emergency warning device such that the sound emitting device is audible external to the aircraft.

In further accordance with the present invention, the mounting assembly modifies a portion of the lower cowling of the aircraft utilizing the design of an existing door assembly, and positioned forward of the fire wall of the aircraft. The mounting assembly comprises a latching mechanism, a hinge, a door, and a biasing assembly. The hinge pivotably connects the door to the aircraft such that the door extends away from the aircraft on the hinge in the open position. The latching mechanism is operably associated with the door and the aircraft such that the door is released under emergency conditions. A mechanical cable assembly extends from the latching mechanism to a handle pull knob located strategically in the cockpit such that the pilot may activate the emergency warning device utilizing his or her discretion upon determining the existence of an emergency condition that requires warning persons below. The biasing means tends to force the door to remain in the open position. Upon activation of the emergency warning device, the mounting assembly continuously exposes the sound emitting device throughout the transition of the landing and thereafter. The door must be closed manually when resetting the system for future operation.

In accordance with an alternative embodiment of the present invention, a portable emergency warning device is suitable for mounting on an aircraft. The portable embodiment comprises a portable mounting assembly, a sound emitting device, a power source, and a switch. The portable mounting assembly comprises a hanger assembly adapted to temporarily mount the portable emergency warning device external to the aircraft such as on the sill of an open window. The power source and manual switch are mounted on a "U" bracket surface inside the cockpit as illustrated in FIGS. 7A, 7B, 7C and 8. The power source provides power to the sound emitting device, and the switch connects the sound emitting device to the power source upon activation. The mounting assembly positions the sound emitting device such that the pulsating sound emitting device is audible external to the aircraft upon activation of the portable emergency warning device.

DETAILED DESCRIPTION OF THE PREFERRED EMBODIMENT

Figure 1:
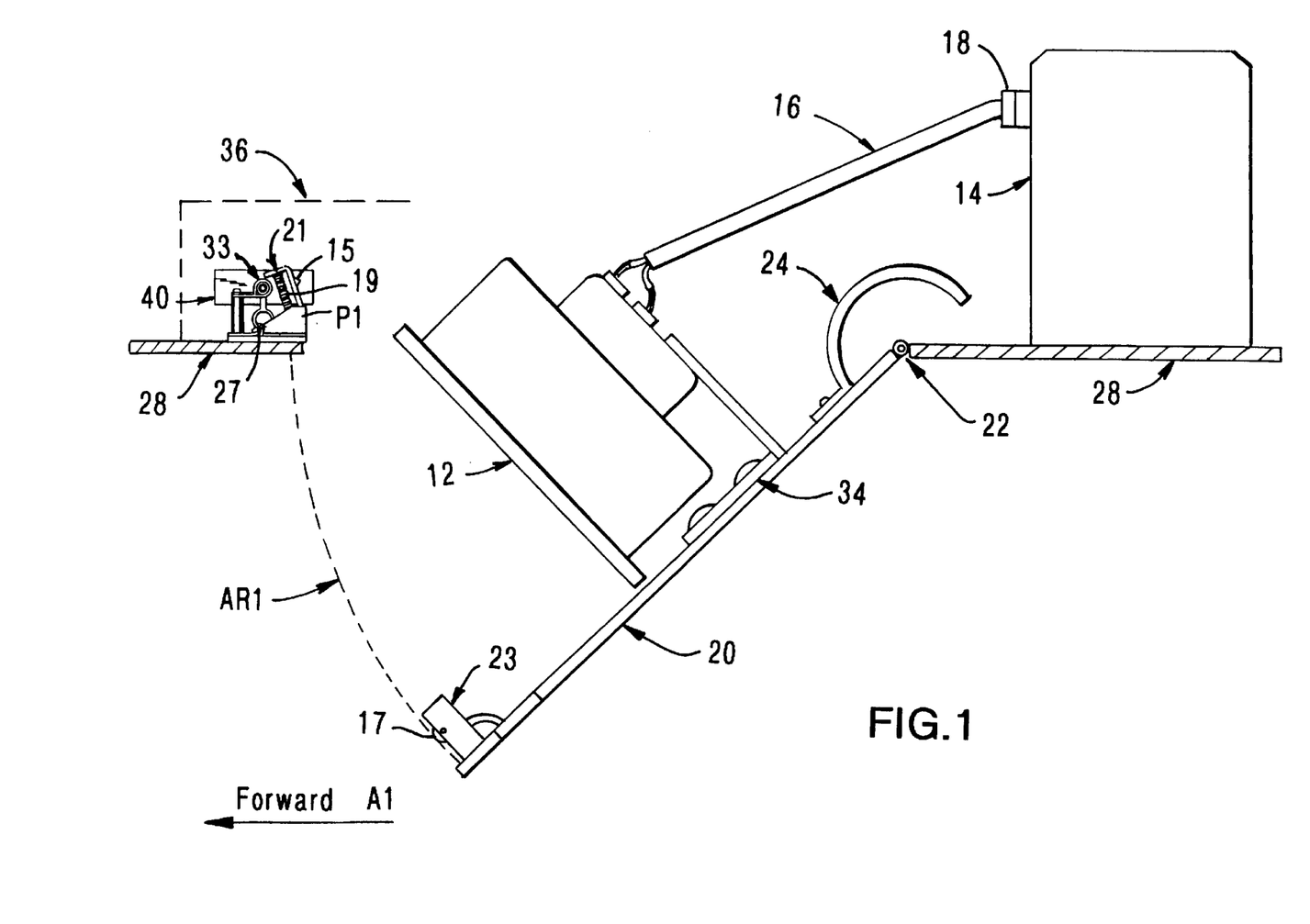
FIG. 1 illustrates a side view of an emergency warning device of the present invention in an open position.

FIG. 1 illustrates an emergency warning device of the present invention in an open position (i.e. activated to emanate pulsating sound to persons below to warn them of imminent danger from an approaching disabled aircraft). The emergency warning device comprises a pulsating horn or sound emitting device 12, an independent power source 14, an electrical cable assembly 16, a connector 18, an existing door assembly comprised of a door 20, hinge 22, spring 24, latching mechanism 36, and a bracket 34. Arrow A1 indicates a forward direction of motion of the aircraft.

The power source 14 is self-contained, independent and electrically isolated from the remaining equipment in the aircraft since, as with a majority of safety devices, the emergency warning device should be able to operate independently of the state of the aircraft that it is responsible for monitoring. That is, an emergency condition typically includes the failure of power in the aircraft, so that it is necessary to have an independent power source for the emergency warning device. The power source comprises batteries such as a gel cell assembly of the appropriate specifications to enable the sound emitting device 12 to operate at a sufficient level of power under a range of conditions and over a minimum duration of time within which the pilot can land the aircraft. In a typical situation, assuming an altitude of 1500 feet above ground level (AGL), propeller windmilling, substantially no wind, flaps up, best rate of glide speed with engine inoperative at 65 knots indicated air speed (IAS), and a rate of descent of 700 feet per minute the maximum glide distance is calculated at 2.3 nautical miles and the time of descent closely approximates two minutes and 9 seconds. The power source is maintained at optimum charge levels by means of periodic charging at the connector 18 interface from a gel cell charger well known in the art. This connector 18 also provides means for monitoring the power supply voltage whenever a voltage check is deemed necessary.

Figure 2:
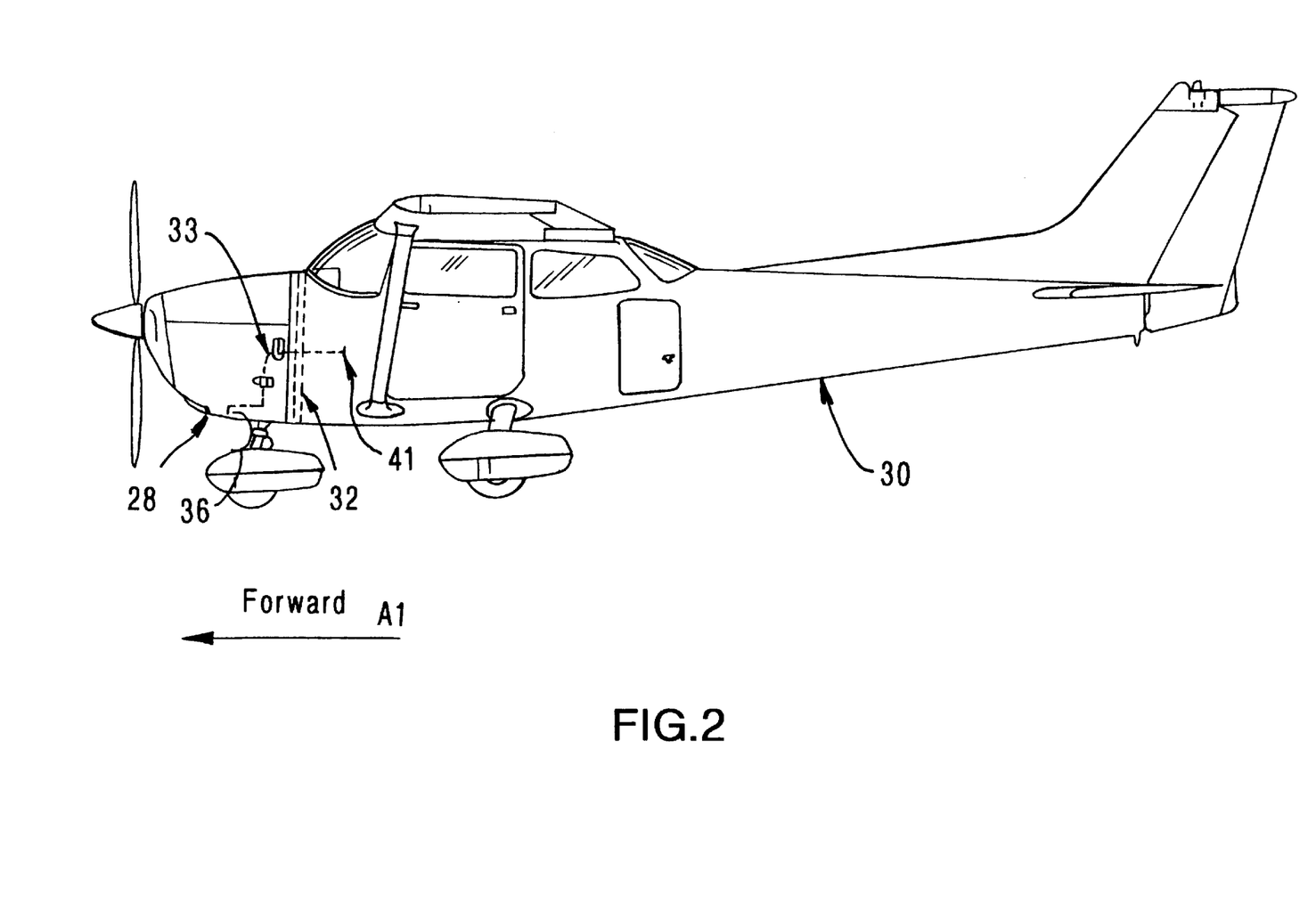
FIG. 2 illustrates a side view of an aircraft in which the emergency warning device of FIG. 1 is typically installed.
Figure 3:
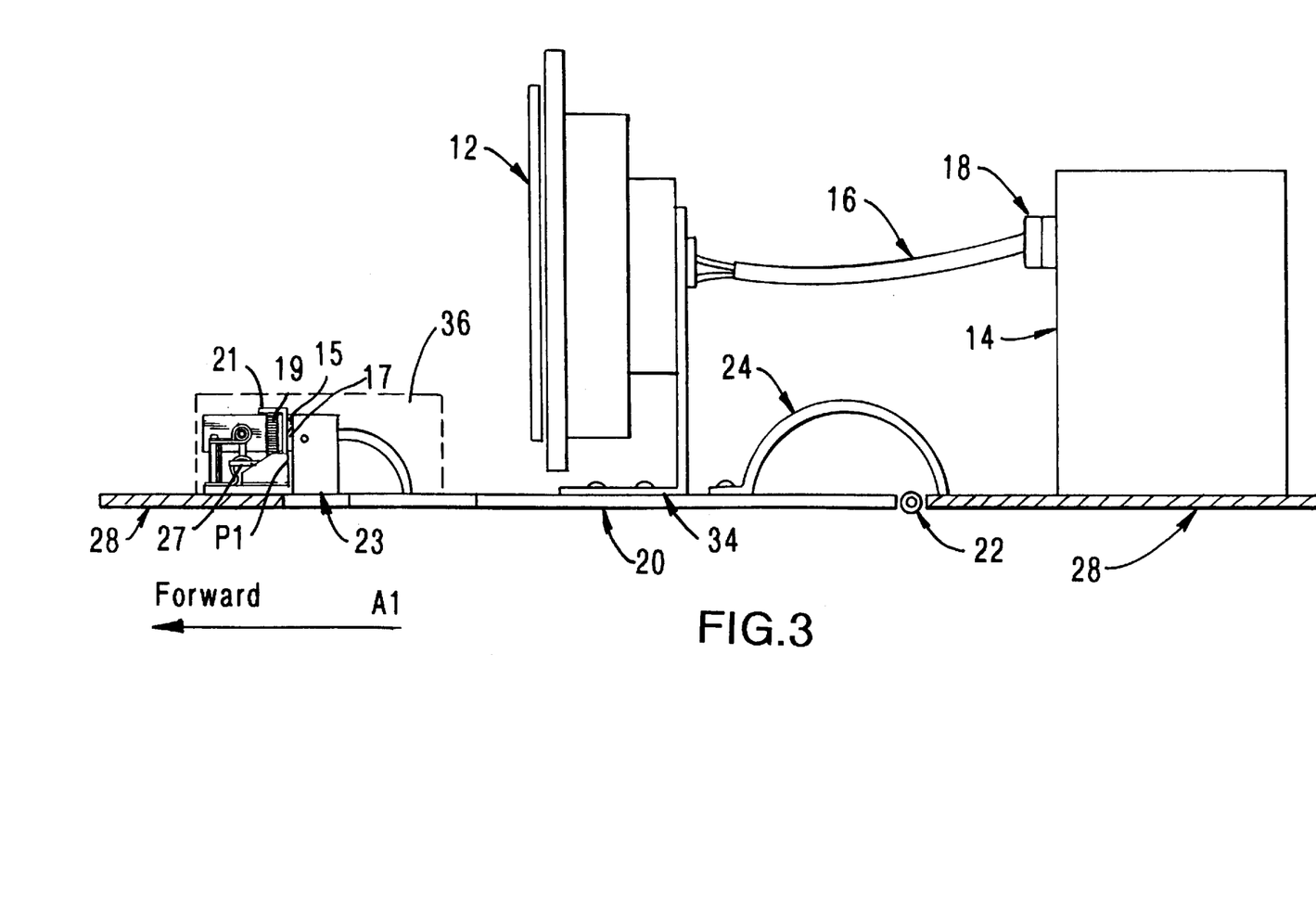
FIG. 3 illustrates a side view of the emergency warning device of FIG. 1 in a closed position.

With reference to FIGS. 2 and 3, the emergency warning device is mounted on the internal side of the underbelly of the aircraft 30, forward of the fire wall 32 on the lower engine cowling 28. Although an airplane is illustrated, the present invention would be applicable to any type of aircraft (e.g., helicopters), that pose a threat to individuals under emergency conditions during their silent descent. When in the open position, as shown in FIG. 1, the sound emitting device 12 is substantially exposed towards the front of the aircraft 30 at a downward angle to optimize the propagation of sound emanating from the sound emitting device 12 to those persons potentially in danger or in the path of the oncoming aircraft 30.

Similarly, FIG. 3 is a cut-away side view illustrating the emergency warning device in a closed position. In the closed position, the door 20 is substantially flush with the underside or underbelly of the aircraft cowling 28 in order to minimize its effect on the aerodynamic characteristics of the aircraft in terms of additional drag or modification of handling characteristics.

Figure 9A:
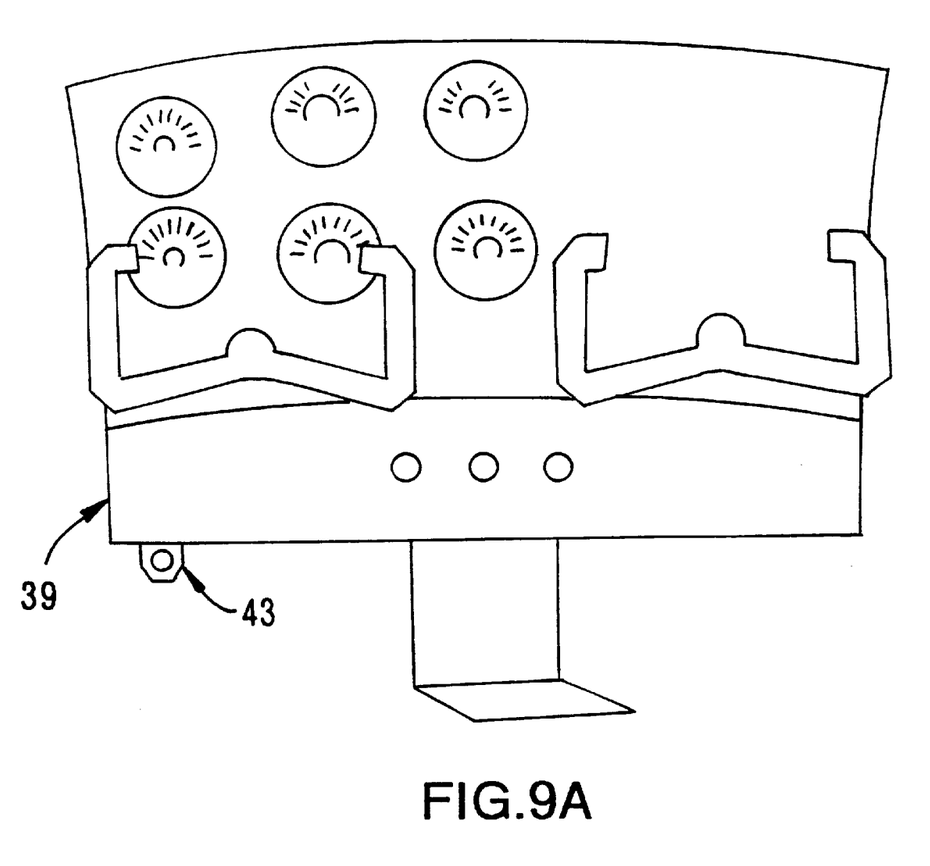
FIG. 9A illustrates a typical cockpit instrument panel showing the preferred location of a mounting bracket for an activation mechanism.
Figure 9B:
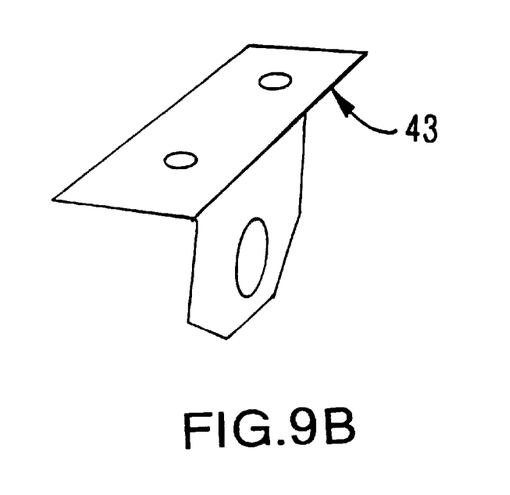
FIG. 9B illustrates the mounting bracket of FIG. 9A.

In the event of an emergency condition such as engine failure, insufficient fuel, reduced oil pressure, loss of altitude, fire or other non-standard operating conditions well known in the art, the emergency warning device is activated. Activation is brought about via action of the pilot or other occupant of the aircraft for instance, by pulling or pushing knob 41 of FIG. 2. The activation means or knob 41 is located beneath the instrument or control panel 39 as shown in FIGS. 9A and 9B, and mechanically connected to the latching mechanism via a cable 33 extending through the fire wall 32 as shown in FIG. 2. The cable 33 is connected in such a way so as to enable cowling removal during maintenance of the aircraft. One method of cable attachment involves inclusion of a hook, loop and biasing means at a predetermined location along the length of the cable 33. If the cowling is to be removed the hook would be removed from its position within the loop, thereby releasing the cable 33. The biasing means would provide tension in the cable so that the hook would not become disengaged from the loop during normal operation of the aircraft. The attachment of the activation means 41 features a minimum alteration of the present configuration within the cockpit and incorporates a mounting bracket 43 to mount the pull and/or push knob, as illustrated in FIGS. 9A and 9B, using existing holes in the structure located in the cabin with fasteners (not shown) to route the mechanical cable assembly through an existing hole in the fire wall.

Upon activation, a fore protrusion 15 of the latching mechanism 36, as illustrated in FIG. 1, which restrains the door 20 in the closed position, releases the door 20. The door 20 then swings away from the aircraft 30 (as illustrated in FIG. 2) in an arc AR1, with the aid of the spring 24 (as illustrated in FIGS. 1 and 3). Further motion of the door 20, along the arc AR1 away from the aircraft 30 FIG. 2, is optionally limited by a restraining cable (not shown).

Upon activation, the sound emitting device 12 is supplied with power from the power source 14 via the cable assembly 16, which connects to the power source 14 via the connector 18. Upon receiving power, the sound emitting device 12 emits a predetermined intermittent sound that warns those in a potential zone up to ¾ of a mile slant range ahead of the aircraft, and a somewhat reduced distance for a circle-to-land maneuver. The slant range is defined as the distance from the aircraft to a projected impact point on the ground ahead of the aircraft. Stated differently, assume that a right triangle is formed in space with the aircraft defining a first point of the triangle directly above a second point of the triangle on the ground. The third or impact point of the triangle is positioned on the ground in front of the aircraft. A hypotenuse of this right triangle connects the third point to the first point. The length of the hypotenuse is the slant range. For example, if the aircraft is approximately 2000 feet above the ground at a glide angle of 45 degrees, then the slant range is equal to approximately 2828.43 feet. If not positioned for a straight-in landing, a circle-to-land maneuver is initiated by the pilot to arrive over the emergency landing area, spiraling down to a safe altitude and then aligning the aircraft for a straight-in landing. The emitted sound typically continues until the emergency warning device is deactivated following termination of the emergency condition. In addition, once in the open position, the door 20 will typically remain in the open position until the aircraft is safely on the ground. However, the emergency warning device incorporates a quick disconnect for deactivation of the sound emitting device 12 under control of the occupant of the aircraft 30. The bracket 34, as shown in FIGS. 1 and 3, ensures that the sound emitting device remains substantially fixed in opposition to air pressure caused by the forward motion of the aircraft 30.

Figure 4:
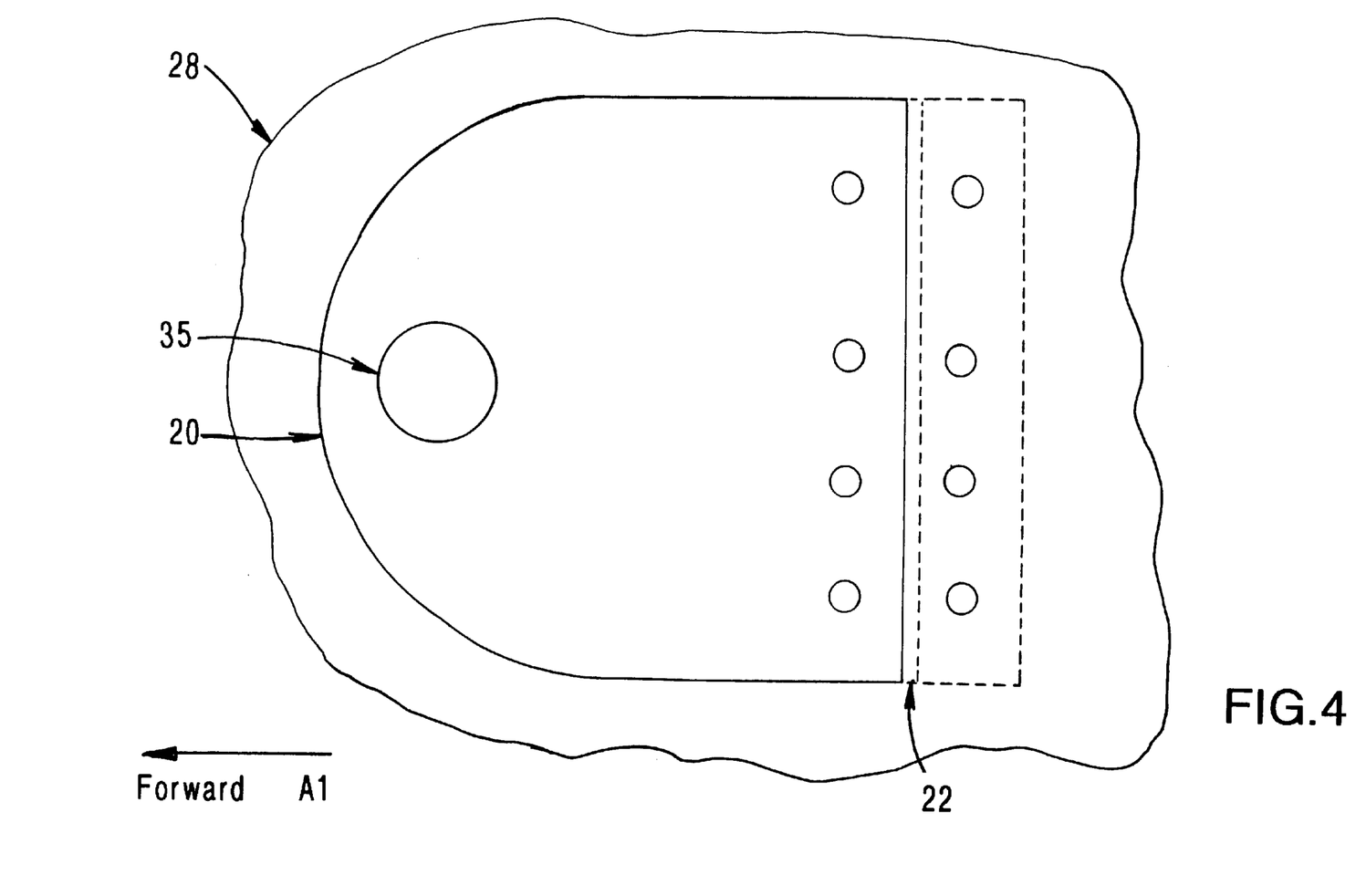
FIG. 4 illustrates a bottom view of a door of the emergency warning device of FIG. 1.

FIG. 4 illustrates a view looking up at the door 20 from the underside of the aircraft. As shown in FIGS. 1, 2, and 3, the door 20 is surrounded by the remainder of the lower engine cowling 28. The hinge 22 permits the door 20 to swing downward such that exposure is toward the front of the aircraft indicated by the arrow A1. The door 20 latching mechanism 36 would likely be made available as a kit with instructions detailing applicable modifications to the existing lower engine cowling 28 upon installation.

Figure 10A:
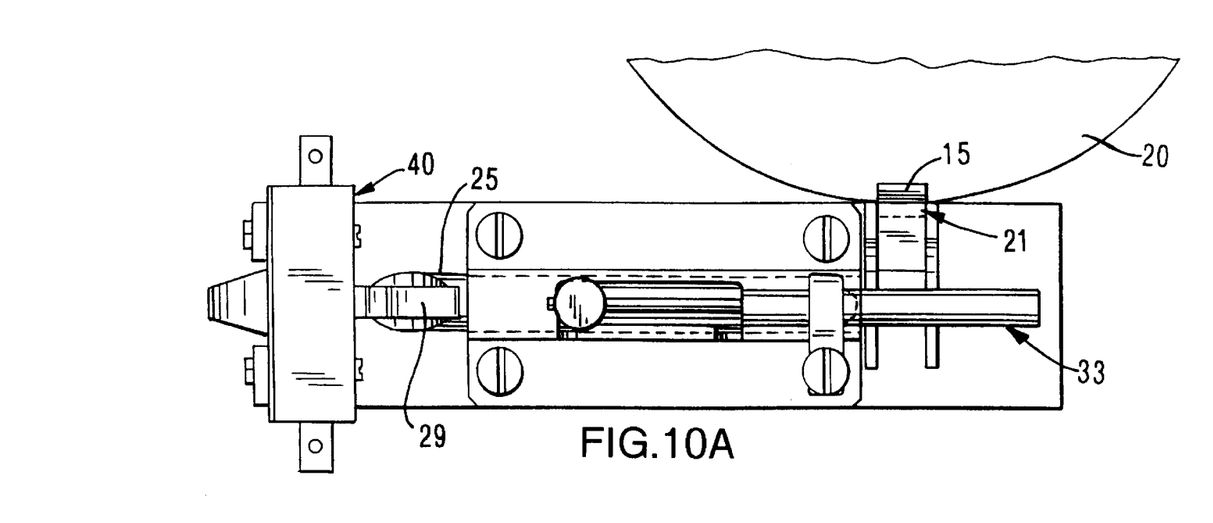
FIGS. 10A–C illustrate a top, front and side view, respectively, of a latching mechanism of the present invention in a closed position.
Figure 10B:
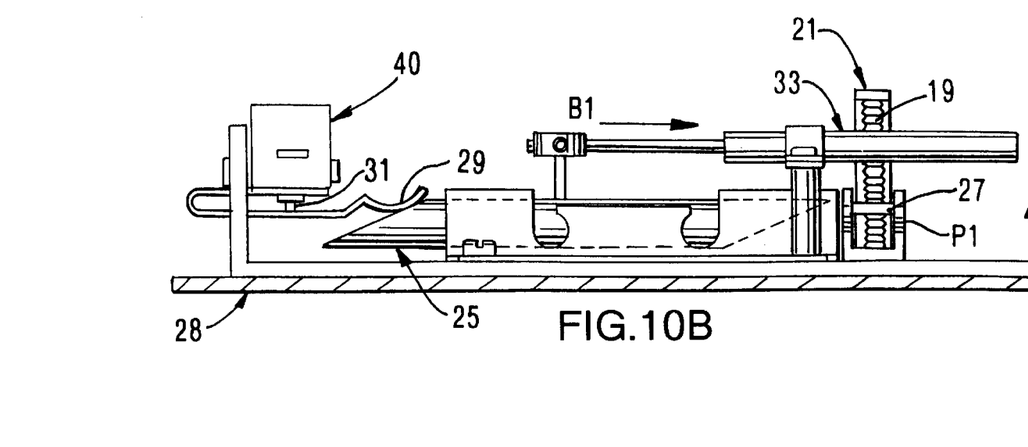
Figure 10C:
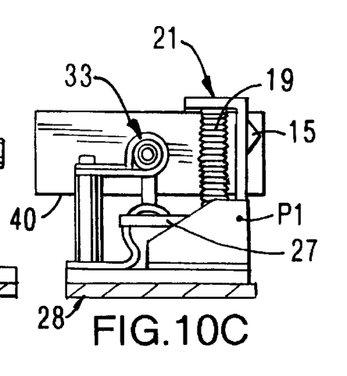
Figure 11A:
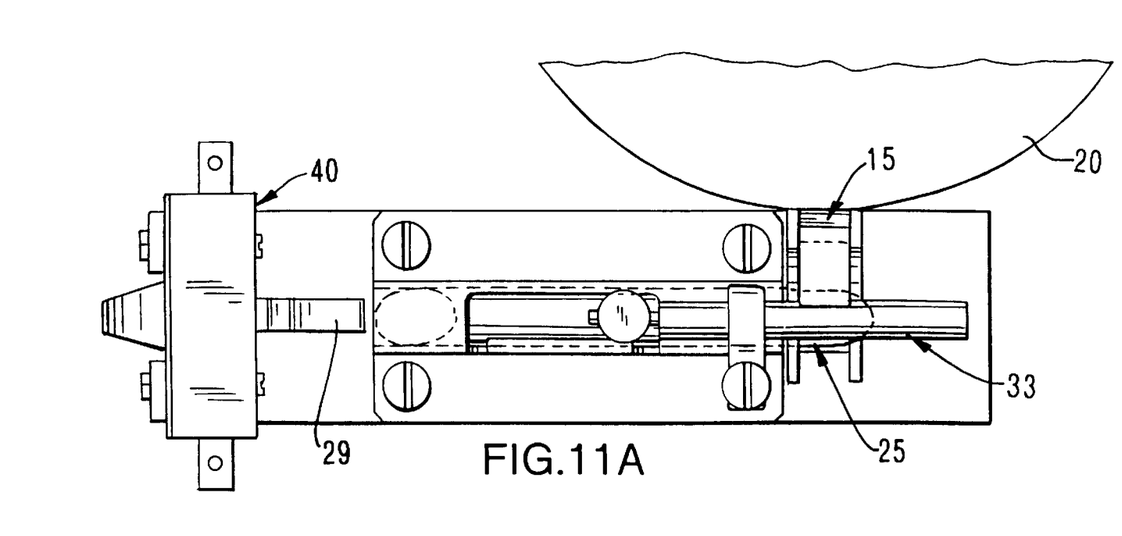
FIGS. 11A–C illustrate a top, front and side view, respectively, of the latching mechanism of FIG. 10A in an open position.
Figure 11B:
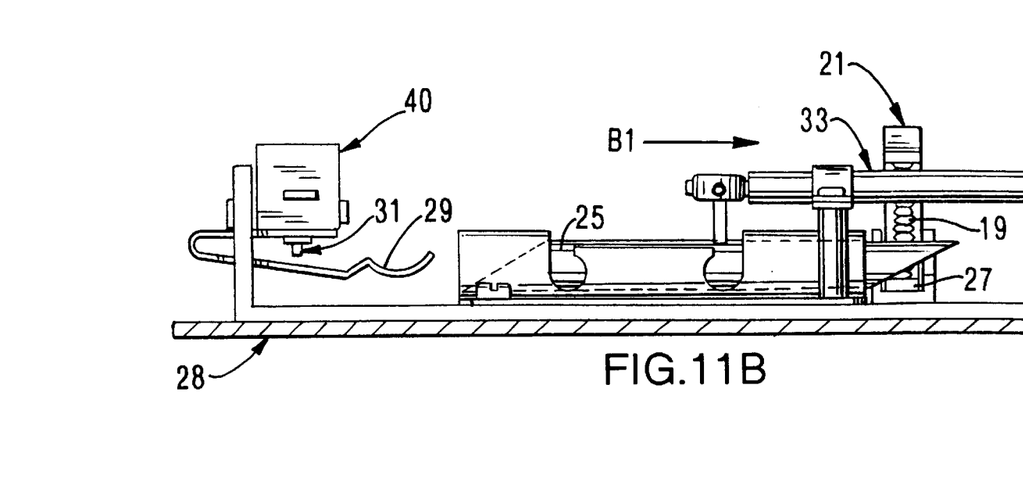
Figure 11C:
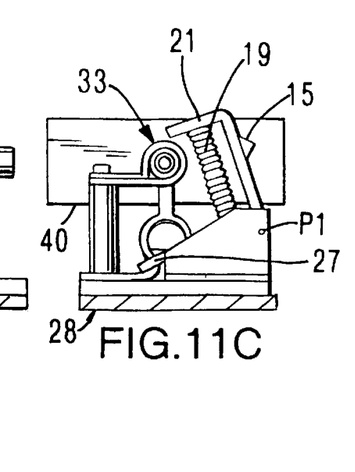

The latching mechanism 36 of FIG. 3 is illustrated in further detail in FIGS. 10A–C and 11A–C and comprises a fore portion 21 and an aft portion 23 as illustrated in FIG. 3. The aft portion 23 is well known in the art and can be found on similar doors throughout the aircraft such as that which covers an oil level access area (not shown). FIGS. 10A–C illustrates the fore portion 21 in a closed position. The cable 33 is attached to a sliding bolt 25 comprising opposing tapers at each end. When the cable 33 is pulled by the knob 41, as illustrated in FIG. 2, in the direction shown by arrow B1, one taper of the sliding bolt 25 exerts a downward force on an arm 27 of the fore portion 21 causing the fore portion 21 to pivot forward about point P1 against the spring 19 as illustrated in FIG. 11C. The forward motion of the fore portion 21 acts to move a fore protrusion 15 on the fore portion 21 away from its original resting position, shown in FIG. 10C, to an open position illustrated in FIG. 11C. The forward motion of the fore protrusion 15 disengages or releases an aft protrusion 17 on the aft portion 23, as illustrated in FIGS. 1 and 3, allowing it to pass and the door 20 to spring open exposing the sound emitting device 12 so that sound can travel forward and downward from the aircraft. The action of pulling the knob and the cable 33 in the direction shown by arrow B1 also activates a micro-switch 40 by permitting an actuator 29 of the micro-switch 40 to bend in a downward arc which in turn permits a button 31 of the micro-switch 40 to extend outward from the micro-switch as shown by comparison between FIGS. 10B and 11B. Upon activation of the micro-switch 40 the circuit illustrated in FIG. 5 is completed which energizes the sound emitting device.

A button 35, as illustrated in FIG. 4, is present in the door 20 in order to facilitate manual access to the emergency warning device outside the aircraft. By depressing the button 35, the aft protrusion 17, as illustrated in FIGS. 1 and 3, on the aft portion 23 is disengaged, thereby releasing the latching mechanism 36 and permitting the door 20 to spring open from the aircraft.

The latching mechanism illustrated in FIGS. 10A–C and 11A–C also enables deactivation of the sound emitting device from within the cockpit. In order to silence the sound emitting device 12, the knob 41 is pushed back to its original position thereby pushing the cable 33 in a direction opposite to that shown by the arrow B1. One of the tapers of sliding bolt 25 attached to the cable 33 then pushes in an upward direction on the actuator 29 of the micro-switch 40 which opens the micro-switch 40 and silences the sound emitting device 12. The door 20, however, will remain in the open position. The details regarding an embodiment of the means for disconnecting the sound emitting device 12 are merely intended to provide an example of one potential approach and are not intended to limit the scope of the invention.

Figure 5:
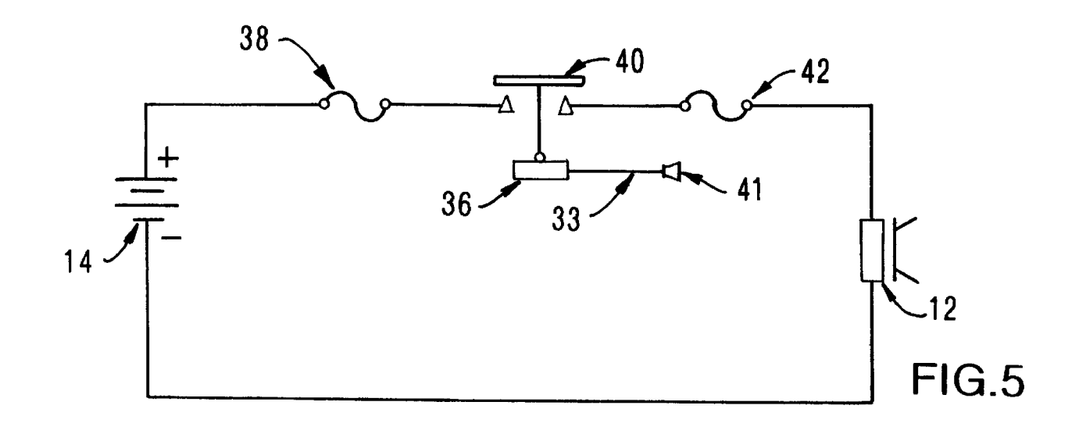
FIG. 5 illustrates a schematic of a circuit for the emergency warning device of FIG. 1.

FIG. 5 illustrates a schematic representation of the circuit used to control the sound emitting device 12 comprising the power source 14, a fuse 38, the micro-switch 40, a thermal flasher switch 42, and the sound emitting device 12. Upon activation of the emergency warning device (e.g. by pulling the knob 41 to release the latching mechanism 36), micro-switch 40 closes, causing the sound emitting device 12 to be energized. Switch 40 is a micro-switch whose actuator is depressed and whose contacts are held in an electrically open position. The cable end of the pull knob causes the door to spring open which simultaneously allows the micro-switch actuator to travel away from the depressed position. This action causes the micro-switch contacts to make contact, thus energizing the sound emitting device 12.

If the current increases beyond a predetermined threshold, fuse 38 opens, thereby protecting against short circuit heat and subsequent damage to the wiring and its insulation. The thermal flasher switch 42 included in the circuit will alternately open and close causing a pulsating sound (approximately 50% duty cycle) from the emitting device 12 which is more desirable than a continuous tone which might be disregarded.

Figure 6:
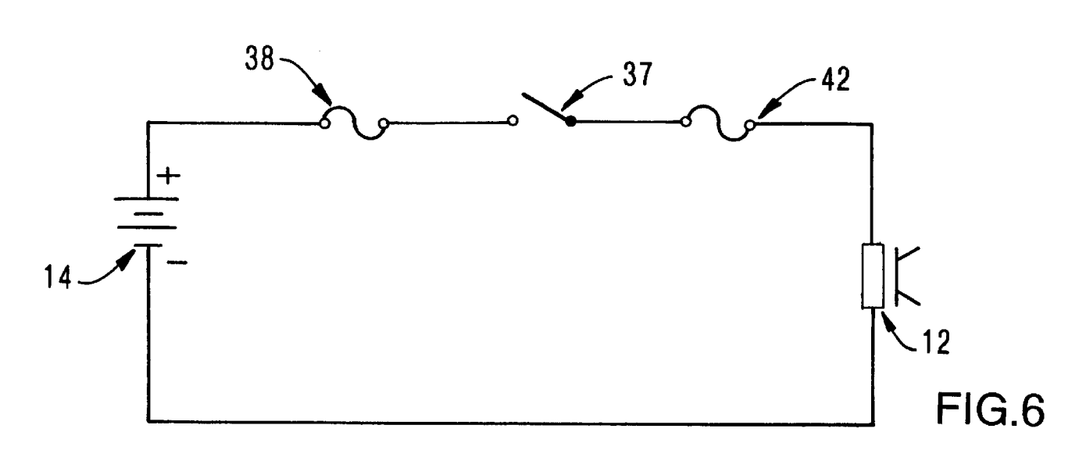
FIG. 6 illustrates an alternative embodiment of the circuit of FIG. 5.
Figure 7A:
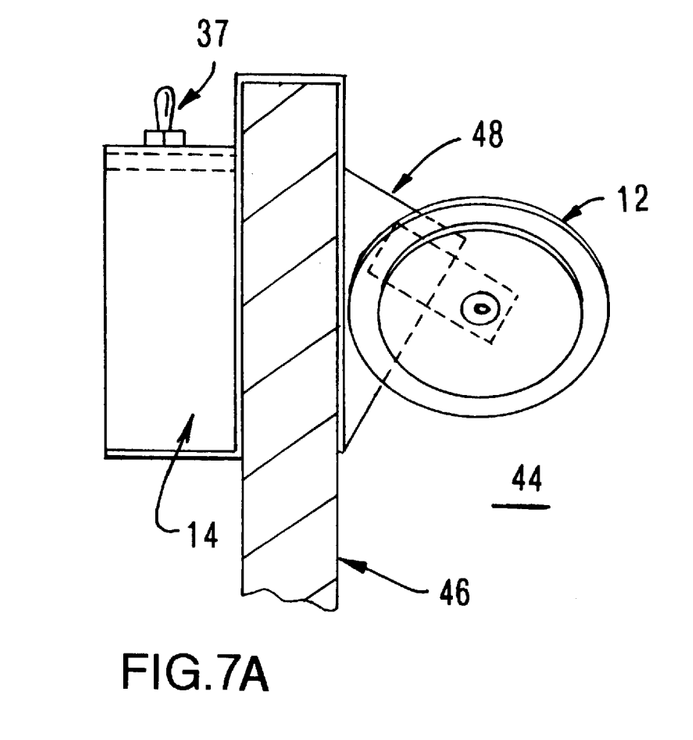
FIGS. 7A and 7B illustrate a front view and a side view, respectively, of a portable emergency warning device of the present invention.
Figure 7B:
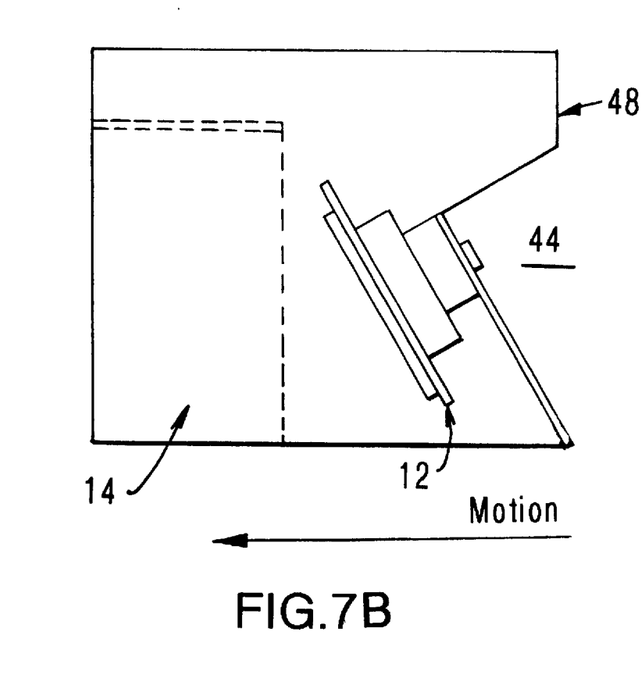
Figure 7C:
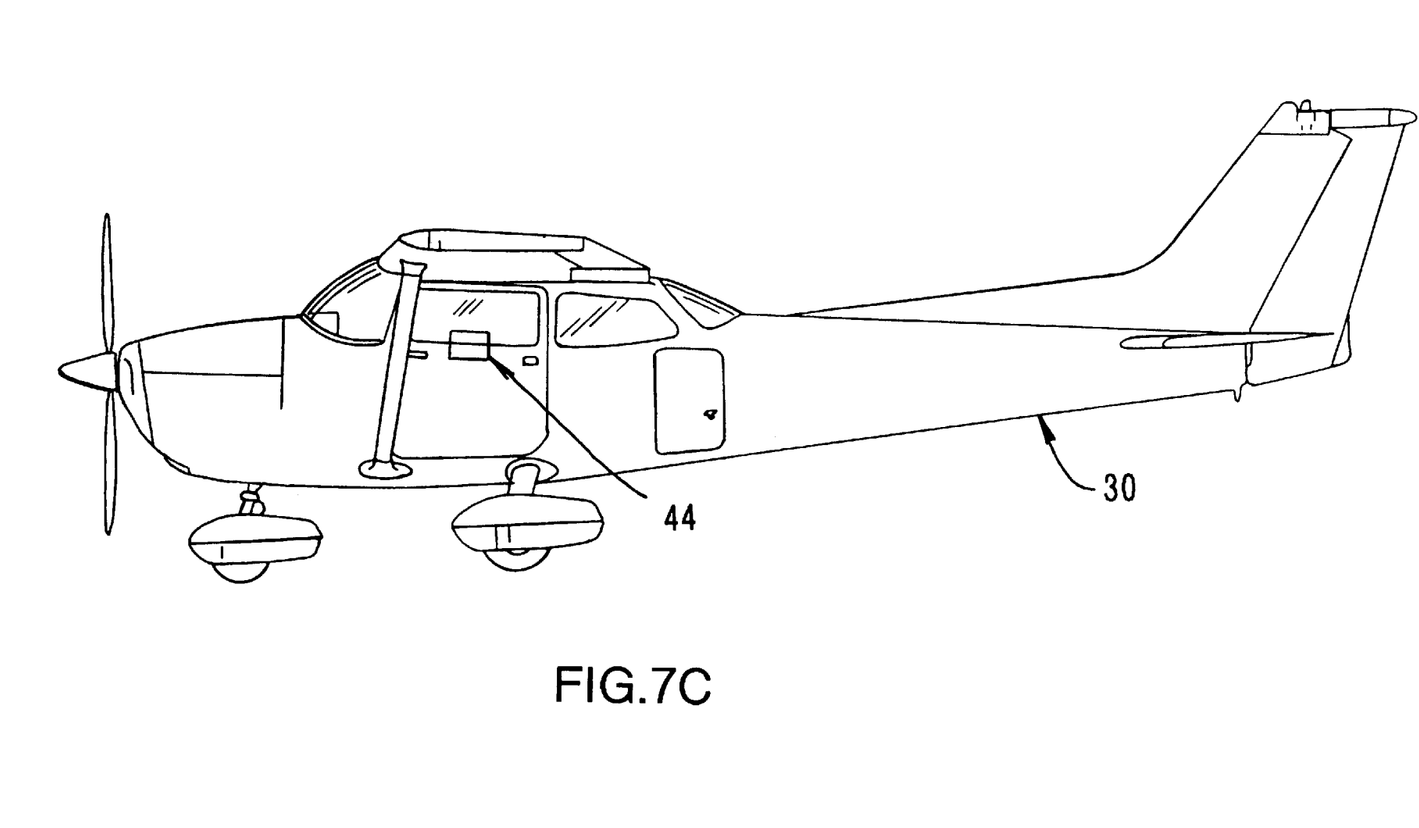
FIG. 7C illustrates a mounting location of the portable emergency warning device of FIGS. 7A and 7B on the aircraft.
Figure 8:
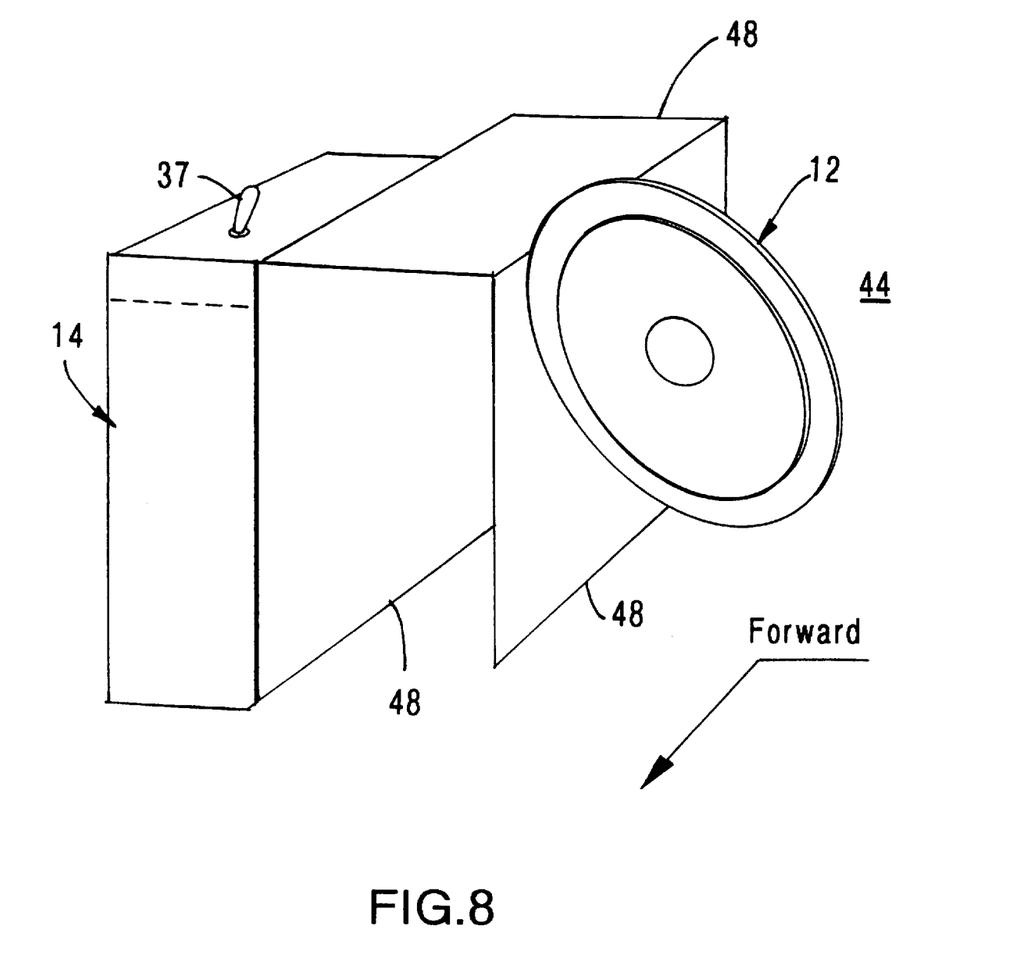
FIG. 8 is a front perspective view of the portable emergency warning device of FIGS. 7A and 7B.

FIG. 6 illustrates an alternative embodiment of the circuit of FIG. 5, comprising substantially similar components to those of FIG. 5, except that micro-switch 40 is replaced by bat handle switch 37 (FIG. 6). When the occupant of the aircraft activates the bat handle switch 37, this completes the circuit path and energizes the sound emitting device 12.

The weight, balance, and dimensions of the emergency warning device should be calculated and specified in order to comply with Federal Aviation Administration (FAA) regulations FAR 43. The device is typically mounted on a flat plate of aluminum with mounting hardware and compliant fasteners. The lower engine cowling 28 may require additional reinforcement such as internal stiffening via channels, ribs, or other supports in order to accept the additional weight of the emergency warning device.

FIGS. 7A–C and FIG. 8 illustrate a portable emergency warning device 44 comprising the power source 14, sound emitting device 12, bat handle switch 37, and a hanger assembly 48. The hanger assembly 48 enables the portable emergency warning device to be removably mounted external to the aircraft 30. The portable emergency warning device is substantially similar in operation to the emergency warning device described earlier, except that it may be removed and mounted on a window sill 46 of the aircraft 30 without the need for permanent retrofitting of the aircraft 30.

During emergency conditions the occupant of the aircraft mounts the portable warning device by sliding the hanger assembly 48, optionally comprising a spring type clamp (not shown) and/or a U-shaped hanger, over the window sill 46 with the remainder of the portable emergency warning device positioned outside the aircraft 30. The occupant will then activate the device via bat handle switch 37, which will energize the sound emitting device 12 causing it to emit the desired pulsating warning sound to those in the predetermined danger zone.

Although the invention has been shown and described with respect to best mode embodiments thereof, it should be understood by those skilled in the art that the foregoing and various other changes, omissions and additions in the form and detail thereof may be made therein without departing from the spirit and scope of the invention.

What is claimed is:

1. An emergency warning device suitable for installation in an aircraft, said aircraft having an external surface and aerodynamic characteristics, said device comprising:
    a mounting assembly comprising an external surface adapted to be substantially flush with said external surface of said aircraft such that said aerodynamic characteristics of said aircraft are not substantially altered when said mounting assembly is in a closed position;
    a sound emitting device mounted on an internal surface of said mounting assembly;
    a power source which provides power to said sound emitting device; and
    a switch which connects said sound emitting device to said power source upon activation of said emergency warning device, said mounting assembly exposing said sound emitting device in an open position upon activation of said emergency warning device such that said sound emitting device is audible external to said aircraft;
    wherein said mounting assembly is positioned forward of a fire wall of said aircraft.

2. The emergency warning device of claim 1, wherein said mounting assembly comprises a portion of a cowling of said aircraft.

3. The emergency warning device of claim 1, wherein said mounting assembly comprises a latching mechanism, a hinge, a door and a biasing assembly, said latching mechanism operably associated with said door and said aircraft such that said door is released under said emergency conditions, said hinge operably associated with said door and said aircraft, said door extending away from said aircraft on said hinge in said open position, said biasing means tending to force said door to remain in said open position.

4. The emergency warning device of claim 1, wherein said mounting assembly comprises a restraining assembly which restricts a distance said mounting assembly is able to extend away from said aircraft in said open position.

5. The emergency warning device of claim 1, wherein said switch comprises a micro-switch for activation by an occupant of said aircraft.

6. The emergency warning device of claim 1, wherein said power source comprises a sealed battery.

7. The emergency warning device of claim 1, where said sound emitting device emits a pulsating sound.

* * * * *